Figures 1, 2:
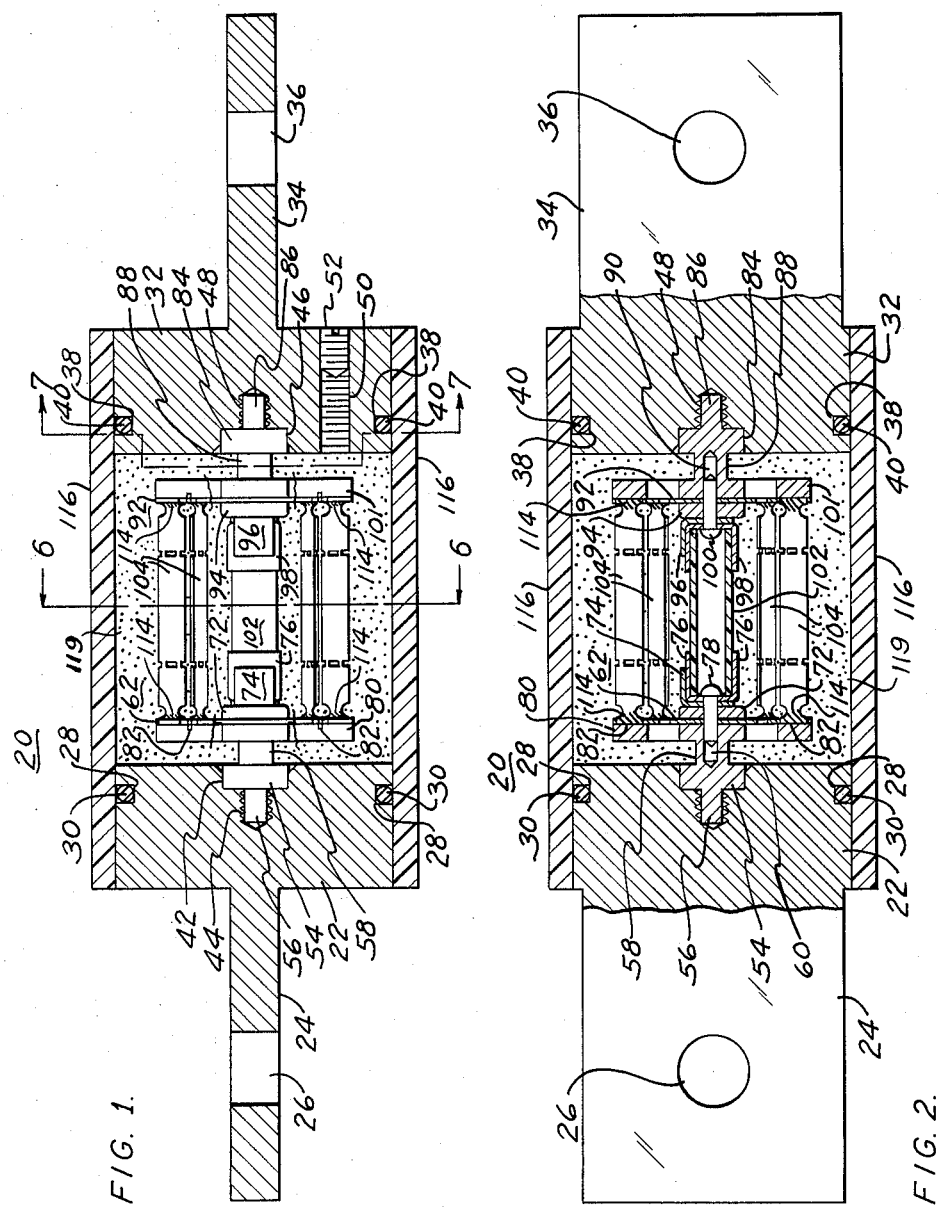

May 24, 1966

J. S. WITHERS 3,253,105

ELECTRIC FUSES

Filed June 28, 1963

3 Sheets-Sheet 1

INVENTOR.
JOHN S. WITHERS
BY
Rey Eilers
ATTORNEY.

May 24, 1966 J. S. WITHERS 3,253,105
ELECTRIC FUSES

Filed June 28, 1963 3 Sheets-Sheet 2

INVENTOR.
JOHN S. WITHERS
BY Rey Eilers
ATTORNEY.

May 24, 1966  J. S. WITHERS  3,253,105
ELECTRIC FUSES
Filed June 28, 1963  3 Sheets-Sheet 3
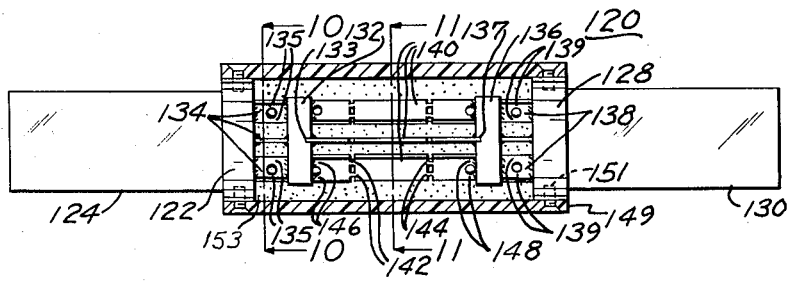
FIG. 9.
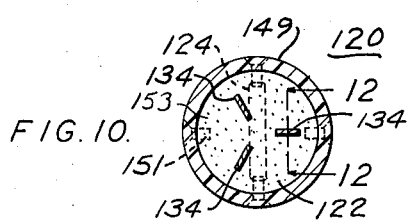
FIG. 10.
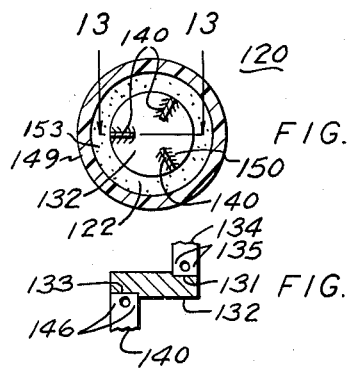
FIG. 11.
FIG. 12.
FIG. 13.
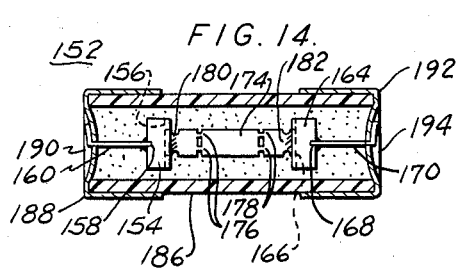
FIG. 14.
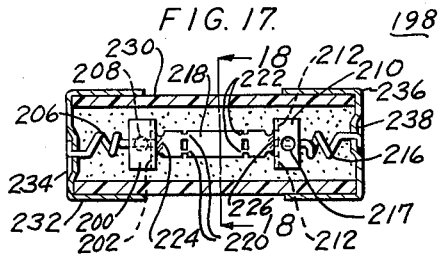
FIG. 17.
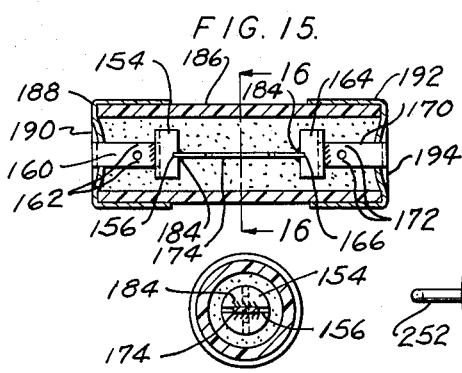
FIG. 15.
FIG. 16.
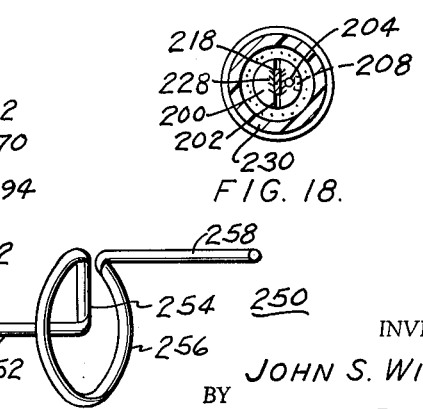
FIG. 18.
FIG. 19.
INVENTOR.
JOHN S. WITHERS
BY Roy Eilers
ATTORNEY.

United States Patent Office 3,253,105
Patented May 24, 1966

3,253,105
ELECTRIC FUSES
John S. Withers, Dellwood, Mo., assignor to McGraw-Edison Company, Elgin, Ill., a corporation of Delaware
Filed June 28, 1963, Ser. No. 291,536
8 Claims. (Cl. 200—120)

This invention relates to improvements in electric fuses. It is, therefore, an object of the present invention to provide an improved electric fuse.

Electric fuses should respond to overloads in the short circuit range to "open" promptly and thereby protect the circuits in which they are incorporated. Yet, those electric fuses should be capable of "carrying" overloads, below the short circuit range, for finite, predetermined, lengths of time. For example, electric fuses that are incorporated in circuits which supply power to electric motors should be capable of carrying the starting currents as well as the rated currents of those motors. In recognition of this fact, a number of "time lag" electric fuses have been proposed; and some of those time lag electric fuses have been produced commercially. The electric fuse provided by the present invention is a time lag electric fuse which can carry the starting currents as well as the rated currents of electric motors; and it is, therefore, an object of the present invention to provide an improved time lag electric fuse which can carry the starting currents as well as the rated currents of electric motors.

The electric fuse provided by the present invention utilizes heat-generating elements to space heat-absorbing members inwardly from the terminals of that electric fuse. Those heat-generating elements make it possible for those heat-absorbing members to be heated to temperatures which are different from, and above, the temperature of those terminals. As a result, while the temperatures of the terminals of the electric fuse will rise somewhat above ambient temperatures, the temperatures of the heat-absorbing members will rise to levels which are well above those ambient temperatures. Fusible elements extend between the confronting faces of the heat-absorbing members, and masses of low melting point material normally connect those fusible elements and those heat-absorbing members. Under normal conditions of operation, the temperatures of the heat-absorbing members will be lower than the melting temperature of the masses of low melting point material; and this means that under normal operating conditions, the low melting point material will provide low resistance connections between the heat-absorbing members and the fusible elements. However, if overloads of a predetermined magnitude continue for a predetermined length of time, the temperatures of the heat-absorbing members will rise to the melting temperature of the low melting point material; and, thereupon, the masses of low melting point material will melt and permit arcs to form between the heat-absorbing members and the fusible elements—those arcs causing the fuse to open the circuit. By having the masses of low melting point material engage the heat-absorbing members, the present invention keeps an arc from forming between one fusible element and one heat-absorbing member until arcs are about ready to form between the rest of the fusible elements and that heat-absorbing member. This avoids premature and needless opening of the circuit. By having the heat-generating elements space the heat-absorbing members inwardly from the terminals, the present invention enables the electric fuse to carry the starting currents as well as the rated currents of electric motors. It is, therefore, an object of the present invention to provide an electric fuse wherein heat-absorbing members are spaced inwardly from the terminals by heat-generating elements and wherein masses of low melting point material normally engage and connect the fusible elements and the heat-absorbing members.

The heat-generating elements of the electric fuse provided by the present invention will coact with the fusible elements of that electric fuse to cause a substantial part of the heat generated within that electric fuse to be generated adjacent the ends of that electric fuse. The heat-absorbing members and the masses of low melting point material are located adjacent the ends of the electric fuse; and those heat-absorbing members will, on low overloads, absorb substantial quantities of the heat generated by the heat-generating elements and the fusible elements. However, on long-continued overloads, the quantities of heat generated by the heat-generating elements and the fusible elements will be so great adjacent the ends of the electric fuse that the heat-absorbing members will be unable to keep the masses of low melting point material from melting. It is, therefore, an object of the present invention to provide an electric fuse wherein the heat-generating elements will coact with the fusible elements to cause a substantial part of the heat generated within that electric fuse to be generated adjacent the ends of that electric fuse.

The heat-absorbing members of the electric fuse provided by the present invention have the confronting faces thereof spaced apart a distance greater than one-half the length of that electric fuse. As a result, the fusible elements of that electric fuse can have lengths which are greater than one-half the length of that electric fuse; and this means that those fusible elements will readily open the circuit when arcs form as those fusible elements open the circuit. It is, therefore, an object of the present invention to provide an electric fuse wherein the heat-absorbing members have the confronting faces thereof spaced apart a distance greater than one-half the length of that electric fuse.

The fusible elements of the electric fuse provided by the present invention have portions of reduced cross-section adjacent the heat-absorbing members. This is desirable because it facilitates prompt opening of the circuit by the arcs which form when the temperature of the masses of low melting point material is raised to the melting point of that material.

Other and further objects and advantages of the present invention should become apparent from an examination of the drawing and accompanying description.

In the drawing and accompanying description, several preferred embodiments of the present invention are shown and described but it is to be understood that the drawing and accompanying description are for the purpose of illustration only and do not limit the invention and that the invention will be defined by the appended claims.

Figure 3:
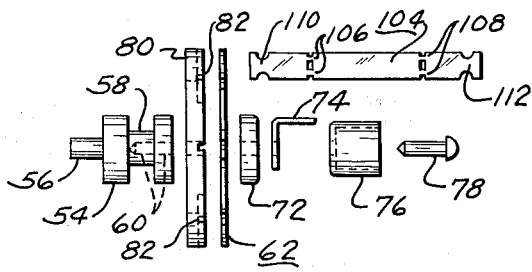
Figure 4:
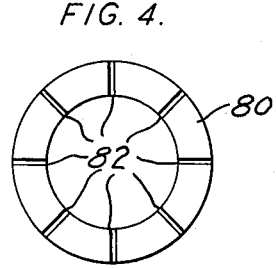
Figure 5:
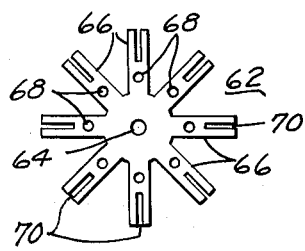
Figure 6:
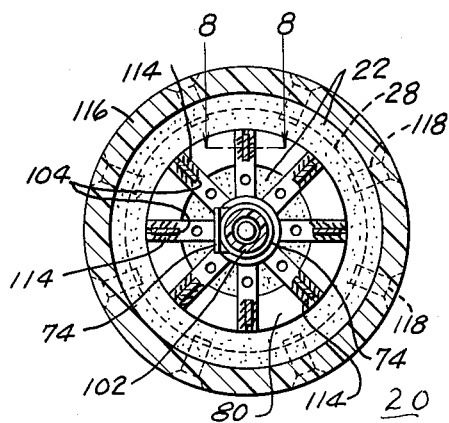
Figure 7:
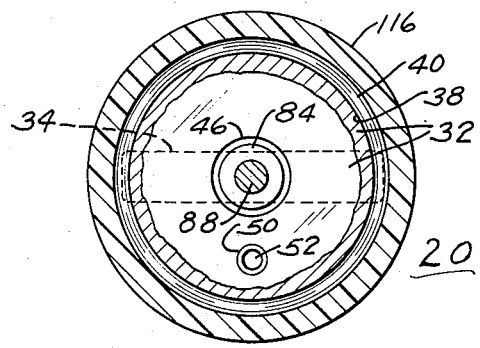
Figure 8:
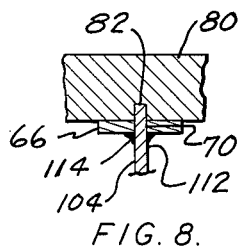

In the drawing, FIG. 1 is a vertical section through one preferred form of electric fuse that is made in accordance with the principles and teachings of the present invention, FIG. 2 is a partially-sectioned plan view of the electric fuse of FIG. 1, FIG. 3 is an exploded plan view of some of the components of the electric fuse of FIG. 1, FIG. 4 is an end elevational view of one of the heat-absorbing members used in the electric fuse of FIG. 1, FIG. 5 is an end elevational view of one of the connecting members used in the electric fuse of FIG. 1, FIG. 6 is a sectional view through the electric fuse of FIG. 1, and it is taken along the plane indicated by the line 6—6 in FIG. 1, FIG. 7 is a sectional view through the electric fuse of FIG. 1, and it is taken along the broken plane indicated by the broken line 7—7 in FIG. 1, FIG. 8 is a sectional view on a larger scale, through the electric fuse of FIG. 1, and it is taken along the plane indicated by the line 8—8 in FIG. 6, FIG. 9 is a vertical section through a second preferred form of electric fuse that is made in accordance with the principles and teachings of the present invention, FIG. 10 is a sectional view through the electric fuse of FIG. 9, and it is taken along the plane indicated by the line 10—10 in FIG. 9, FIG. 11 is another sectional view through the electric fuse of FIG. 9, and is taken along the plane indicated by line 11—11 in FIG. 9, FIG. 12 is a sectional view through the electric fuse of FIG. 9, and is taken along the plane indicated by line 12—12 in FIG. 10, FIG. 13 is another sectional view through the electric fuse of FIG. 9, and it is taken along the plane indicated by the line 13—13 in FIG. 11, FIG. 14 is a vertical section through another preferred form of electric fuse that is made in accordance with the principles and teachings of the present invention, FIG. 15 is a horizontal section through the electric fuse of FIG. 14, FIG. 16 is a sectional view through the electric fuse of FIG. 14, and is taken along the plane indicated by line 16—16 in FIG. 15, FIG. 17 is a vertical section through still another preferred form of electric fuse that is made in accordance with the principles and teachings of the present invention, FIG. 18 is a sectional view through the electric fuse of FIG. 17, and it is taken along the plane indicated by the line 18—18 in FIG. 17, and FIG. 19 is a large scale view of a heat-generating element that can be used in the electric fuse of FIGS. 9–13.

Referring to FIGS. 1–8 in detail, the numeral 20 generally denotes one form of electric fuse that is made in accordance with the principles and teachings of the present invention. That fuse has an end bell 22; and that end bell has a cylindrical body portion and a flat, outwardly-extending securing portion 24. An opening 26 is provided in the securing portion 24, and that opening can accommodate a bolt or other fastener. An annular recess 28 is formed in the end bell 22; and that annular recess is dimensioned to accommodate an O-ring 30.

The numeral 32 denotes an end bell which is similar to the end bell 22. The end bell 32 has a cylindrical body portion and a flat, outwardly-extending securing portion 34. An opening 36 is provided in the securing portion 34; and that opening can accommodate a bolt or other fastener. An annular recess 38 is formed in the end bell 32; and that annular recess is dimensioned to accommodate an O-ring 40. The O-rings 30 and 40 are resilient in nature; and they are dimensioned so the outer peripheries thereof project outwardly beyond the peripheries of the end bells 22 and 32 whenever those O-rings are unstressed.

The numeral 42 denotes a socket in the end bell 22 which opens to the right-hand face of that end bell. That socket is circular in elevation; and the outer edge of that socket is tapered. A threaded recess 44 is provided in the end bell 22; and that recess opens to the socket 42. The threaded recess 44 and the socket 42 are coaxial with each other and with the end bell 22.

A socket 46 is provided in the end bell 32; and that socket opens to the left-hand face of that end bell. That socket is circular in elevation; and the outer edge of that socket is tapered. A threaded recess 48 is provided in the end bell 32; and that recess opens to the socket 46. The threaded recess 48 and the socket 46 are coaxial with each other and with the end bell 32. A threaded passage 50 is provided in the end bell 32; and a threaded plug 52 can be disposed within that passage to block that passage. However, that plug can be removed from that passage to permit the introduction of material through that passage.

The numeral 54 denotes a heat-generating element which is spool-like in configuration, and which has a cylindrical portion that is dimensioned to fit nicely within the socket 42 in the end bell 22. That heat-generating element has a reduced diameter cylindrical end 56 which fits nicely within the threaded recess 44 in that end bell. That heat-generating element has a reduced diameter "neck" 58, which is adjacent the right-hand face of the end bell 22; and a cylindrical socket 60 is formed in that neck and in the right-hand end of the heat-generating element 54. An alloying material, such as solder, will be used to permanently secure the heat-generating element 54 to the end bell 22; and the threads of the threaded recess 44 will facilitate the flow of that material into intimate and bonding engagement with the heat-generating element and the end bell 22.

The numeral 62 generally denotes a connecting member which is used in the fuse 20; and that connecting member is shown in detail in FIG. 5. That connecting member has a disk-like central portion with an opening 64 at the center thereof. Fingers 66 project radially outwardly from that disk-like central portion; and openings 68 are provided in those fingers. Also, slots 70 are provided in the outer ends of those fingers. The connecting member 62 abuts the outer face of the heat-generating element 54, as shown particularly by FIG. 2.

A disk-like heat-absorbing member 72 has an opening at the center thereof; and that member is circular in cross section. That heat-absorbing member abuts the right-hand face of the central portion of the connecting member 62, as shown particularly by FIG. 2.

An identification tag 74 has a generally circular central portion which abuts the right-hand face of the heat-absorbing member 72; and that identification tag has an indicia-bearing portion which extends at right angles from that generally circular central portion. The indicia-bearing portion of the identification tag 74 can have indicia stamped therein to indicate the ampere rating of the fuse; and that indicia will help assemblers select the proper components to be used in the assembling of that fuse.

The numeral 76 denotes a ferrule which has an opening in the closed end thereof. That closed end is set in engagemnet with the right-hand face of the generally circular central portion of the identification tag 74; and the openings in ferrule 76, in identification tag 74, in heat-absorbing member 72, and in connecting member 62 are alined with the socket 60 in the heat-generating element 54. A drive pin 78 is forced through those alined openings and into that socket to permanently interconnect the heat-generating element 54, the connecting member 62, the heat-absorbing member 72, the identification tag 74, and the ferrule 76.

An annular heat-absorbing member 80 has an outer diameter which is close to the diameter of a circle formed by the outer ends of the fingers 66 of the connecting member 62. That heat-absorbing member has radially-directed slots 82 in the right-hand face thereof; and those slots will be alined with the notches 70 in the connecting member 62 when the right-hand face of that heat-absorbing member is set in abutting engagement with the left-hand face of that connecting member.

The numeral 84 denotes a heat-generating element which is identical with the heat-generating element 54. The heat-generating element 84 has a cylindrical portion that is dimensioned to fit nicely within the recess 46 in the end bell 32. That heat-generating element has a reduced-diameter cylindrical end 86 which fits nicely within the threaded recess 48 in that end bell. That heat-generating element has a reduced diameter "neck" 88, which is adjacent the left-hand of the end bell 32; and a cylindrical socket 90 is formed in that neck and in the left-hand end of the heat-generating element 84. An alloying material such as solder, will be used to permanently secu the heat-generating element 84 to the end bell 32; and the threads of the threaded recess 48 will facilitate the flow of that material into intimate bonding engagement with the heat-generating element 84 and the end bell 32.

The numeral 92 generally denotes a connecting member which is identical to the connecting member 62. The connecting member 92 abuts the left-hand face of the heat-generating element 84; and the central opening in that connecting member is alined with the socket 90 in that heat-generating element. A disk-like heat-absorbing member 94, which is identical to the heat-absorbing member 72, abuts the left-hand face of the connecting member 92. The central opening in the heat-absorbing member 94 is alined with the opening in the connecting member 92 and with the socket 90 in the heat-generating element 84. An identification tag 96, which is identical to the identification tag 74, abuts the left-hand face of the heat-absorbing member 94; and the central opening of the identification tag 96 is alined with the openings in that heat-absorbing member and in the connecting member 92 and with the socket 90 in the heat-generating element 84. A ferrule 98, which is identical to the ferrule 76, abuts the left-hand face of the central portion of the identification tag 96. The opening in the closed end of the ferrule 98 is alined with the openings in the central portion if the identification tag 96 and in the heat absorbing member 94 and in the connecting member 92 and with the socket 90 in the heat-generating element 84; and a drive pin 100 extends through those openings and into that socket to permanently secure the ferrule 98, the identification tag 96, the heat-absorbing member 94, and the connecting member 92 to the heat generating element 84.

The numeral 101 denotes an annular heat-absorbing member which is identical to the heat-absorbing member 80. However, the notches in the heat-absorbing member 101 are in the left-hand face of that member, whereas the notches in the heat-absorbing member 80 are in the right-hand face of that member. The notches in the heat-absorbing ring 101 are alined with the slots in the ends of the fingers of the connecting member 92.

The numeral 102 denotes a tube of insulation; and that tube has an outer diameter which is just slightly smaller than the inner diameters of the ferrules 76 and 98. As a result, the ends of that tube can telescope snugly withing those ferrules. During the assembling of the fuse 20, the tube 102 helps maintain the heat-generating elements 54 and 84 concentric and also spaces the connecting members 62 and 92 apart a predetermined distance.

The numeral 104 denotes fusible elements which are shown as flat, elongated strips of metal. Each fusible element has two week spots 106; and those weak spots are formed by a slot and two notches. Also, each fusible element has two weak spots 108; and those weak spots are formed by a slot and two notches. Further, each fusible element 104 has two weak spots 110 and 112; and those weak spots are formed by arcuate notches. The ends of the fusible elements 104 extend into the slots 70 in the connecting members 62 and 92 and also extend into the notches 82 in the heat-absorbing members 180 and 101.

Masses of low melting point material 114, such as tin or solder, normally connect the fusible elements 104 to the connecting members 62 and 92 and to the heat-absorbing members 80 and 101, and also connect those heat-absorbing members to those connecting members. The outer ends of the fingers 66 of the connecting members 62 and 92 constitute, in effect, portions of the heat absorbing members 80 and 101.

Preferably, the heat-generating elements 54 and 84, the connecting members 62 and 92, the heat-absorbing members 72 and 94, the ferrules 76 and 98, the identification tags 74 and 96, and the drive pins 78 and 100 are assembled together and then soldered. The resulting assembly will then have good electrical and thermal conduction between the components thereof.

Under normal conditions of load, the masses of low melting point material 114 will provide low resistance connections between the fusible elements 104 and the heat-absorbing members 80 and 101. However, in the event long-continued overloads cause the heat-generating elements 54 and 84 and the fusible elements 104 to raise the temperature of the heat-absorbing members 80 and 101, of the connecting members 62 and 92, and of the masses of low melting point material 114 to the melting temperature of that low melting point material, that low melting point material will melt. The melting of the low melting point material will permit arcs to form between the fusible elements 104 and the heat-absorbing members 80 and 101; and those arcs will cause opening of the circuit.

The numeral 116 denotes a cylindrical casing which is telescoped over the end bells 22 and 32. The inner surface of that casing is dimensioned to closely engage the peripheries of those end bells and to compress the O-rings 30 and 40. As a result, a tight seal is provided for the fuse 20 whenever the housing 116 is in the position shown by FIGS. 1 and 2. Drive screws 118 extend through radially-directed openings in the housing 116 and seat in radially-directed sockets in the end bells 22 and 32.

Filler material 119, such as sand, can be introduced into casing 116 through the passage 50. Once the interior of that casing has been filled with the filler material 119, the plug 52 can be set within the passage 50 to close that passage.

The outwardly-extending securing portions 24 and 34 of the fuse 20 can be suitably secured to conductors which form part of a circuit to be protected. Current will then flow from one of those conductors via securing portion 24, end bell 22, heat-generating element 54, connecting chamber 62, low melting point material 114, fusible elements 104, low melting point material 114, connecting member 92, heat-generating element 84, end bell 32, and securing portion 34. The flow of current through the heat-generating elements 54 and 84, the flow of current through the connecting members 62 and 92, and the flow of current through the fusible elements 104 will cause those elements and members to generate heat. The greatest proportions of the heat generated by the heat-generating elements 54 and 84 will be generated in the reduced-diameter necks 58 and 88, the greatest proportions of the heat generated by the connecting member 62 and 92 will be generated adjacent the openings 68, and the greater proportions of the heat generated by the fusible elements will be generated adjacent the weak spots 110, 106, 108 and 112. Under normal conditions of load, the end bells 22 and 32 and the heat-absorbing members 72 and 94 will absorb enough heat from the heat-generating elements 54 and 84, and the heat-absorbing members 80 and 101 and the filler material 119 will absorb enough heat from the fusible elements 104, to keep the low melting point material 114 from reaching its melting point. This means that under normal conditions of load, the fuse 20 will be able to carry current indefinitely. In fact, that fuse will be able to carry transient overloads of substantial size without blowing.

In the event an overload in the short circuit range occurs, the weak spots 110, 106, 108 and 112 of the fusible elements 104 will generate heat so rapidly that the heat-absorbing members 80 and 101 will be incapable of absorbing that heat rapidly enough to keep those weak spots from fusing. As a result, the fusible elements 104 will promptly respond to overloads in the short circuit range to fuse and open the circuit, thereby protecting the circuit against damage. The filler material 119 will quickly and safely extinguish any arcs that form as the fusible elements 104 fuse.

In the event overloads of predetermined values, below the short circuit range, occur and continue for predetermined lengths of time, the amount of heat generated by the heat-generating elements 54 and 84 and by the fusible elements 104 will be so great that the end bells 22 and 32, the heat-absorbing members 72 and 94, and the heat-absorbing members 80 and 101 will be unable to absorb that heat rapidly enough to keep the temperatures of the heat-absorbing members 80 and 101 from rising to the melting temperature of the low melting point material 114. Thereupon, arcs will form adjacent the ends of the fusible elements 104; and those arcs will cause the circuit to open. The filler material 119 will quickly and safely extinguish those arcs.

It will thus be apparent that the fuse 20 will be able to carry its rated current continuously, while being able to protect the circuit against objectionable overloads. That fuse will open the circuit promptly when overloads in the short circuit range occur, and will thus protect the circuit against injury; and that fuse will respond to prolonged overloads below the short circuit range to open the circuit, and will thus protect the circuit against injury. Yet, the fuse 20 will not open on overloads which are of such short duration that they could not be hurtful.

It will be noted that none of the masses 114 of low melting point material adjacent the heat-absorbing member 80 can reach its melting temperature until that heat-absorbing member itself reaches that melting temperature. Similarly, none of the masses 114 of low melting point material adjacent the heat-absorbing member 101 can reach its melting point until that heat-absorbing member itself reaches that melting temperature. This is desirable because it makes certain that no arcs will form until arcs are ready to form adjacent all of the fusible elements 104.

The length of each of the fusible elements 104 is greater than one-half of the length of the cavity defined by the casing 116 and the end bells 22 and 32. As a result, those fusible elements can safely and quickly open the circuit.

Referring to FIGS. 9–13 in detail, the numeral 120 generally denotes a second preferred embodiment of electric fuse that is made in accordance with the principles and teachings of the present invention. The numeral 122 denotes an end bell which is cylindrical in form and which has a flat, outwardly-extending securing portion 124. That securing portion is dimensioned to fit into standard knife blade fuse clips. Three equally-spaced notches 126 are formed in the right-hand face of the end bell 122; and one of those notches is shown in detail in FIG. 12.

The numeral 128 denotes another end bell which is cylindrical in form and which has a flat, outwardly-extending securing portion 130. That securing portion is dimensioned to fit within standard knife blade fuse clips. The end bell 128 has three equally-spaced notches which are in register with the notches 126 in the end bell 122; but the notches in the end bell 128 are in the left-hand face of that end bell. In adition, the end bell 128 has a passage, not shown, therethrough; and that passage can be selectively closed by a plug, not shown. That passage and that plug are comparable to the passage 50 and the plug 52 in FIG. 1.

The numeral 132 denotes a disk-like heat-absorbing member which has a diameter smaller than the diameter of the end bell 122. That heat-absorbing member has three equally-spaced notches 131 in the left-hand face thereof which are in register with the notches 126 in the end bell 122. The heat-absorbing member 132 also has three equally-spaced notches 133 in the right-hand face thereof; but those notches are staggered relative to the notches 131 in the left-hand face of that heat-absorbing member.

The heat-absorbing member 136 has three equally-spaced notches in the right-hand face thereof, and those notches are in register with the notches in the end bell 128. That heat-absorbing member has three equally-spaced notches 137 in the left-hand face thereof; and those notches are staggered relative to the notches in the right-hand face of that heat-absorbing member. The notches 137 are in register with the notches 133 in the right-hand face of the heat-absorbing member 132.

Three short heat-generating elements 134 have the left-hand ends thereof disposed within the notches 126 in the end bell 122 and have the right-hand ends thereof disposed within the notches 131 in the heat-absorbing member 132. High-temperature solder fixedly secures those heat-generating elements to that end bell and to that heat-absorbing member. The heat-generating elements 134 have weak spots 135 which are defined by openings in those heat-generating elements. The weak spots 135 will respond to the passage of current through the heat-generating elements 134 to generate substantial quantities of heat.

Three short heat-generating elements 138 have the left-hand ends thereof disposed within the notches in the right-hand face of the heat-absorbing member 136 and have the right-hand ends thereof disposed within the notches in the left-hand face of the end bell 128. High-temperature solder fixedly secures those heat-generating elements to that end bell and to that heat-absorbing member. The heat-generating elements 138 have weak spots 139 which are defined by openings in those heat-generating elements. These weak spots will respond to the passage of current through the heat-generating elements 138 to generate substantial quantities of heat.

The heat-generating elements 134 physically support the heat-absorbing member 132 while thermally isolating that heat-absorbing member from the end bell 122. The heat-generating elements 138 physically support the heat-absorbing member 136 while isolating that heat-absorbing member from the end bell 128.

Three elongated fusible elements 140 extend between the heat-absorbing members 132 and 136; and the left-hand ends of those fusible elements are lodged within the slots 133 in the heat-absorbing member 132 while the right-hand ends of those fusible elements are lodged within the slots 137 in the heat-absorbing member 136. Each of those fusible elements has a plurality of weak spots 142 which are formed by a slot and two notches, has a plurality of weak spots 144 which are formed by a slot and two notches, has a plurality of weak spots 146 formed by an opening, and has a plurality of weak spots 148 formed by an opening. Those weak spots will respond to the passage of current through those fusible elements to generate appreciable quantities of heat.

Masses 150 of low melting point material engage the fusible elements 140 and the heat-absorbing members 132 and 136. Those masses of low melting point material are immediately adjacent the weak spots 146 and 148 but will not fill the openings which define those weak spots.

A tubular casing 149 of insulating material is telescoped over the end bells 122 and 128. The inner diameter of that casing is just slightly larger than the diameters of those end bells; and hence a snug fit is provided between that casing and those end bells. Fasteners 151 extend inwardly through openings in the casing 149 and seat in radially-directed sockets in the end bells 122 and 128.

Filler material, such as sand, will fill the cavity defined by the casing 149 and the end bells 122 and 128. That filler material can be introduced into that cavity through the passage, not shown, in the end bell 128.

When the securing portions 124 and 130, respectively, of the end bells 122 and 128 are set within knife blade fuse clips, current will flow from securing portion 124 via end bell 122, heat-generating elements 134, heat-absorbing member 132, low melting point material 150, fusible elements 140, low melting point material 150, heat absorbing member 136, heat-generating elements 138, end bell 128, and securing portion 130. The passage of current through the heat-generating elements 134 and the heat-generating elements 138 will cause those heat-generating elements to generate appreciable quantities of heat. Similarly, the passage of current through the fusible elements 140 will cause those fusible elements to generate appreciable quantities of heat. However, as long as the value of the current flowing through the fuse 120 does not exceed the rating of that fuse, the end bells 122 and 128 and their securing portions 124 and 130 can dissipate enough of the heat generated by the heat-generating elements 134 and 138 to keep the temperatures of the heat-absorbing members 132 and 136 below the melting temperature of the low melting point material 150. This means that the fuse 120 will be able to carry its rated current indefinitely. In fact, that fuse will be able to carry transient overloads of substantial size without blowing.

In the event an overload in the short circuit range occurs, the weak-spots 146, 142, 144 and 148 of the fusible elements 140 will generate heat so rapidly that the heat-absorbing members 132 and 136 will be incapable of absorbing that heat rapidly enough to keep those weak spots from fusing. As a result, the fusible elements 140 will promptly respond to overloads in the short circuit range to fuse and open the circuit, thereby protecting the circuit against damage. The filler material 153 will quickly and safely extinguish any arcs that form as the fusible elements 140 fuse.

In the event overloads of predetermined values, below the short circuit range, occur and continue for predetermined lengths of time, the amount of heat generated by the heat-generating elements 134 and 138 and by the fusible elements 140 will be so great that the end bells 122 and 128 and the heat-absorbing members 132 and 136 will be unable to absorb that heat rapidly enough to keep the temperatures of the heat-absorbing members 132 and 136 from rising to the melting point of the masses 150 of low melting point material. Thereupon, arcs will form adjacent the ends of the fusible elements 140; and those arcs will cause the circuit to open. The filler material 153 will quickly and safety extinguish those arcs.

It will thus be apparent that the fuse 120 will be able to carry its rated current continuously, while being able to protect the circuit against objectionable overloads. That fuse will open the circuit promptly when overloads in the short circuit range occur, and will thus protect the circuit against injury; and that fuse will respond to prolonged overloads below the short circuit range to open the circuit, and will thus protect the circuit against injury. Yet, the fuse 120 will not open on overloads which are of such short duration that they could not be hurtful.

It will be noted that none of the masses 150 of low melting point material adjacent the heat-absorbing member 132 can reach its melting temperature until that heat-absorbing member itself reaches that melting temperature. Similarly, none of the masses 150 of low melting point material adjacent the heat-absorbing member 136 can reach its melting point until that heat-absorbing member itself reaches that melting temperature. This is desirable because it makes certain that no arcs will form until arcs are ready to form adjacent all of the fusible elements 140.

Referring to FIGS. 14–16 in detail, the numeral 152 generally denotes a third preferred form of electric fuse that is made in accordance with the principles and teachings of the present invention. That fuse has a disk-like heat-absorbing member 154; and a diametrically-directed slot 156 is formed in the right-hand face of that heat-absorbing member. A diametrically-directed slot 158 is formed in the left-hand face of that heat-absorbing member; and those slots are displaced form each other about ninety degrees. A heat-generating element 160 has the right-hand end thereof seated within the slot 158 in the heat-absorbing member 154; and high-melting point material, such as solder, will bond that heat-generating element to that heat-absorbing member. That heat-generating element has weak spots 162 defined by an opening therein; and that opening is adjacent the left-hand face of the heat-absorbing member 154.

The numeral 164 denotes a disk-like heat-absorbing member which is identical to the heat-absorbing member 154. A diametrically-directed slot 166 is formed in the left-hand face of the heat-absorbing member 164; and a diametrically-directed slot 168 is formed in the right-hand face of that heat-absorbing member. The slot 166 will be in register with the slot 156 in the right-hand face of the heat-absorbing member 154. A heat-generating element 170 has the left-hand end thereof disposed within the slot 168 in the heat-absorbing member 164; and high-melting point material, such as solder, will bond that heat-generating element to that heat-absorbing member. That heat-generating element has weak spots 172 defined by an opening therein; and that opening is adjacent the right-hand face of the heat-absorbing member 164.

A fusible element 174 has the left-hand thereof extending into the slot 156 in the heat-absorbing member 154, and has the right-hand end thereof extending into the slot 166 in the heat-absorbing member 164. That fusible element has weak spots 176 which are defined by a slot and two notches, has weak spots 178 which are defined by a slot and two notches, has a weak spot 180 defined by two arcuate notches, and has a weak spot 182 defined by two arcuate notches. The weak spots 180 and 182 are, respectively, immediately adjacent the heat-absorbing members 154 and 164.

Masses 184 of low melting point material normally connect the fusible element 174 with the heat-absorbing members 154 and 164. However, those masses do not fill the arcuate notches which define the weak spots 180 and 182 of the fusible element 174.

A casing 186 encloses the heat-generating element 160, the heat-absorbing member 154, the fusible element 174, the heat-absorbing member 164, and the heat-generating element 170; and the diameters of the heat-absorbing members 154 and 164 are considerably smaller than the inner diameter of that casing. A ferrule 188, which has a slot in the closed end thereof, telescopes over the left-hand end of the casing 186; and the slot in the closed end of that ferrule telescopes over the left-hand end of the heat-generating element 160. The closed end of the ferrule 188 is concave to accommodate a bent-over portion of the heat-generating element 160, and also to accommodate high melting point solder 190 which bonds that bent-over portion to that ferrule.

A ferrule 192, which has a slot in the closed end thereof, telescopes over the right-hand end of the casing 186; and the slot in the closed end of that ferrule telescopes over the right-hand end of the heat-generating element 170. That closed end of that ferrule is concaved to accommodate a bent-over potrion of the heat-generating element 170, and also to accommodate high melting point solder 194 that bonds that bent-over portion to that ferrule.

Filler material, such as sand, will be introduced into the casing 186 after one of the ferrules has been secured to that casing but before the other of those ferrules has been secured to that casing. That filler material will quickly and safely extinguish any arcs that may form as the fuse 152 opens the circuit.

The heat-generating elements 160 and 170 have, for purposes of emphasis, been shown slightly longer than they are. Each of those heat-generating elements has a length, exclusive of its bent-over portion, just less than one-sixth the length of the cavity defined by the casing 186 and the ferrules 188 and 192. Each of the heat-absorbing members 154 and 164 has an axial dimension just less than one-twelfth the length of the cavity defined by the casing 186 and the ferrules 188 and 192. This means that the fusible element 174 has a length greater than one-half the length of the cavity defined by the casing 186 and the ferrules 188 and 192.

The ferrules 188 and 192 are dimensioned to fit into standard fuse clips. When those ferrules are mounted within such clips, current will flow from ferrule 188 via solder 190, heat-generating element 160, heat-absorbing member 154, low melting point material 184, fusible element 174, low-melting point material 184, heat-absorbing member 164, heat-generating element 170, solder 194, and ferrule 192. The heat-generating elements 160 and 170 will respond to the passage of current therethrough to generate heat; and that heat will tend to raise the temperatures of the heat-absorbing members 154 and 164. However, as long as the value of the current flowing through the fuse 152 is less than the rating of that fuse, the ferrules 188 and 192 will be able to dissipate enough of the heat generated by the heat-generating elements 160 and 170 to keep the temperatures of the heat-absorbing members 154 and 164 below the melting point of the masses 184 of low melting point material. As the rated current of the fuse 152 flows through the fusible element 174, that fusible element will generate heat; but the heat-absorbing members 154 and 164 will be able to absorb enough of that heat to keep the temperatures of the masses 184 of low melting point material below their melting points. This means that the fuse 152 is able to carry its rated current continuously and indefinitely. In fact, that fuse is able to carry transients overloads of substantial size without blowing.

In the event an overload in the short circuit range occurs, the weak spots 180, 176, 178 and 182 will generate heat so rapidly that the heat-absorbing members 154 and 164 will not be able to absorb heat from the fusible element 174 rapidly enough to keep the weak spots of that fusible element from fusing. As a result, the fuse 152 will promptly respond to overloads in the short circuit range to fuse and open the circuit, thereby protecting the circuit against injury.

In the event overloads of predetermined values, below the short circuit range, occur and continue for predetermined lengths of time, the amount of heat generated by the fusible element 174 and by the heat-generating elements 160 and 170 will raise the temperatures of the heat-absorbing members 154 and 164 to the melting point of the masses 184 of low-melting point material. Thereupon, arcs will form adjacent the ends of the fusible element 174; and those arcs will cause that fusible element to open the circuit. This is desirable because it enables the fuse 152 to protect the circuit against injury due to overloads which exceed a predetermined value but which are below the short circuit range.

It will thus be apparent that the fuse 152 will be able to carry its rated current continuously, while being able to protect the circuit against objectionable overloads. That fuse will open the circuit promptly when overloads in the short circuit range occur, and will thus protect the circuit against injury; and that fuse will respond to prolonged overloads below the short circuit range to open the circuit, and will thus protect the circuit against injury. Yet, the fuse 152 will not open on overloads which are of such short duration that they could not be hurtful.

Referring to FIGS. 17 and 18 in detail, the numeral 198 generally denotes a fourth preferred form of electric fuse that is made in accordance with the principles and teachings of the present invention. That fuse has a disk-like heat-absorbing member 200; and a diametrically-directed slot 202 is formed in the right-hand face of that heat-absorbing member. Also, that heat-absorbing member has a hole 204 extending through it; and that hole is parallel to, but is displaced from, the geometric axis of that heat-absorbing member. A coiled heat-generating element 206 has the right-hand end thereof extending into the hole 204 in the heat-absorbing member 200; and a portion 208 of that heat-absorbing member is staked to prevent separation of the heat-generating element 206 from that heat-absorbing member.

The numeral 210 denotes a disk-like heat-absorbing member which is identical to the heat-absorbing member 200. That heat-absorbing member has a diametrically-directed slot 212 in the left-hand face thereof, and has an opening which is parallel to, but is displaced from, the geometric axis of that heat-absorbing member. That opening accommodates one end of a coiled heat-generating member 216; and a portion 217 of the heat-absorbing member 210 is staked to prevent separation of that heat-generating member from that heat-absorbing member.

The numeral 218 denotes a fusible element which has the left-hand end thereof extending into the slot 202 in the heat-absorbing member 200 and which has the right-hand thereof extending into the slot 212 in the heat-absorbing member 210. That fusible element has weak spots 220 which are defined by a slot and two notches, has weak spots 222 which are defined by a slot and two notches, has a weak spot 224 defined by two arcuate notches, and has a weak spot 226 defined by two arcuate notches. The weak spots 224 and 226 are immediately adjacent the confronting faces of the heat-absorbing members 200 and 210.

Masses 228 of low-melting point material normally connect the fusible element 218 with the heat-absorbing members 200 and 210. However, those masses do not fill the notches which define the weak spots 224 and 226.

The numeral 230 denotes a tubular casing which telescopes over the heat-generating element 206, the heat-absorbing member 200, the fusible element 218, the heat-absorbing member 210, and the heat-generating element 216. The inner diameter of that casing is appreciably larger than the diameters of the heat-absorbing members 200 and 210.

A ferrule 232 is dimensioned to telescope over the left-hand end of the casing 230; and the closed end of that ferrule has an opening therein. That opening accommodates the left-hand end of the heat-generating element 206. The closed end of that ferrule is concave in part to accommodate a bent-over portion of that heat-generating element, and also to accommodate high-melting point solder 234 which bonds that bent-over portion to that ferrule. A ferrule 236 is dimensioned to telescope over the right-hand end of the casing 230; and the closed end of that ferrule has an opening therein. That opening accommodates the right-hand end of the heat-generating element 216. The closed end of the ferrule 236 is concave in part to accommodate a bent-over portion of that heat-generating element, and also to accommodate high-melting point solder 238 which bonds that bent-over portion to that ferrule.

Filler material, such as sand, will be introduced into the casing 230 after one of the ferrules has been secured to that casing but before the other of those ferrules has been secured to that casing. That filler material will quickly and safely extinguish any arcs that may form as the fuse 198 opens the circuit.

The heat-generating elements 206 and 216 have, for purposes of emphasis, been shown slightly longer than they are. Each of those heat-generating elements has a length, exclusive of its bent-over portion, just less than one-sixth the length of the cavity defined by the casing 230 and the ferrules 232 and 236. Each of the heat-absorbing members 200 and 210 has an axial dimension just less than one-twelfth the length of the cavity defined by the casing 230 and the ferrules 232 and 236. This means that the fusible element 218 has a length greater than one-half the length of the cavity defined by the casing 230 and the ferrules 232 and 236.

The ferrules 232 and 236 are dimensioned to fit into fuse clips of standard size and design. When those ferrules are disposed within such fuse clips, current can flow from ferrule 232 via solder 234, heat-generating element 206, heat-absorbing member 200, low-melting point material 228, fusible element 218, low-melting point material 228, heat-absorbing member 210, heat-generating element 216, solder 238, and ferrule 236. The current passing through the heat-generating elements 206 and 216 will cause those heat-generating elements to supply heat to the heat-absorbing members 200 and 210. However, as long as the value of the current flowing through the fuse 198 is below the rating of that fuse, the ferrules 232 and 236 will dissipate enough of the heat generated by the heat-generating elements 206 and 216 to keep the temperatures of the heat-absorbing members 200 and 210 below the melting points of the masses 228 of low-melting point material. The flow of current through the fusible element 218 also will tend to heat the heat-absorbing members 200 and 210; but as long as the value of the current flowing through the fuse 198 is below the rating of that fuse, the temperatures of the heat-absorbing members 200 and 210 will remain below the melting temperature of the masses 228 of low-melting point material. This means that the fuse 198 can carry its rated current continuously and indefinitely. In fact, that fuse is able to carry transient overloads of substantial size without blowing.

In the event an overload in the short circuit range occurs, the weak spots 224, 220, 222 and 226 will generate heat so rapidly that the heat-absorbing members 200 and 210 will be unable to absorb heat from the fusible element 218 at a sufficiently rapid rate to keep those weak spots from fusing. As a result, the fusible element 218 will promptly fuse and thereby protect the circuit against injury.

In the event overloads of predetermined values, below the short circuit range, occur and continue for predetermined lengths of time, the amount of heat generated by the fusible element 218 and by the heat-generating elements 206 and 216 will raise the temperatures of the heat-absorbing members 200 and 210 to the melting temperature of the masses 228 of low-melting point material. Thereupon, arcs will form adjacent the ends of the fusible element 218; and those arcs will cause that fusible element to open the circuit. This is desirable because it enables the fuse 198 to prevent injury to the circuit from overloads which are above a predetermined value but which are below the short circuit range.

It will thus be apparent that the fuse 198 will be able to carry its rated current continuously, while being able to protect the circuit against objectionable overloads. That fuse will open the circuit promptly when overloads in the short circuit range occur, and will thus protect the circuit against injury; and that fuse will respond to prolonged overloads below the short circuit range to open the circuit and will thus protect the circuit against injury. Yet, the fuse 198 will not open on overloads which are of such short duration that they could not be hurtful.

In each of the forms of electric fuse shown by the drawing, heat-absorbing members are spaced inwardly of the terminals of the fuse, and heat-generating elements are interposed between those heat-absorbing members and those terminals. As a result, the temperatures of those heat-absorbing members can be different from and above the temperatures of those terminals. Also in each of those forms of electric fuse, the masses of low-melting point material directly engage the heat-absorbing members; and hence those masses cannot melt until the temperatures of the heat-absorbing members reach the melting temperature of those masses. Furthermore, in each of the said forms of electric fuse, the heat-absorbing members will have sufficient thermal mass to require finite periods of time to elapse before the temperatures of those heat-absorbing members can rise to the melting point of those masses. This is important and desirable because it keeps the masses of low-melting point material from prematurely melting and thus prematurely causing opening of the circuit.

In the fuse 120 of FIGS. 9–13, the weak spots adjacent the heat-absorbing members are defined by openings; whereas in the fuses of FIGS. 1–8, of FIGS. 14–16, and of FIGS. 17 and 18 the weak spots adjacent the heat-absorbing members are defined by notches. Any of those various weak spots could be defined by an opening or could be defined by notches. However, notches are preferred, because they seem to facilitate more positive opening of the circuit when the fuses blow on overloads below the short circuit range.

Referring to FIG. 19 in detail, the numeral 250 generally denotes a heat-generating element which can be substituted for the heat-generating elements 134 of the fuse of FIGS. 9–13. That heat-generating element can also be substituted for the heat-generating elements 138 of the fuse of FIGS. 9–13. In addition, smaller versions of the heat-generating element 250 can be substituted for the heat-generating elements 160 and 170 of the fuse of FIGS. 14–16 or for the heat-generating elements 206 and 216 of the fuse of FIGS. 17 and 18.

The heat-generating element 250 has a relatively short straight portion 252 which can be suitably secured to the end bell 122 or the end bell 128 of FIG. 9, to the ferrule 188 or the ferrule 192 of FIG. 14, or to the ferrule 232 or the ferrule 236 of FIG. 17. A short portion 254 extends laterally from the free end of the straight portion 252; and an arcuate portion 256 extends circumferentially from the outer end of the short portion 254. A second straight portion 258 extends from the free end of the arcuate portion 256, and that second straight portion is parallel to the straight portion 252. The free end of the second straight portion 258 can be suitably secured to the heat-absorbing member 132 or the heat-absorbing member 136 of FIG. 9, to the heat-absorbing member 154 or the heat-absorbing member 164 of FIG. 14, or to the heat-absorbing member 200 or the heat-absorbing member 210 of FIG. 17.

The heat-generating element 250 is preferably made from a single piece of wire; and that wire should be stiff enough to support the heat absorber to which the free end of the second straight portion 258 thereof is secured. The material used in making the heat-generating element 250 and the cross section of that heat-generating element will be selected to provide a desired per-inch resistance for that heat-generating element. Thereafter, the exact amount of overall resistance desired for that heat-generating element can be established by providing the desired length for the arcuate portion—and this, without changing the spacing between the outer ends of the straight portions 252 and 258. All of this means that the overall resistance of the heat-generating element 250 can be established simply and easily, and without any need of changing the spacing between the heat-absorbing member and the terminal to which that heat-generating element is secured.

The electric fuses provided by the present invention are able to provide the desirable circuit-opening characteristics of dual element fuses and yet can be encased within relatively small casings. For example, those electric fuses can safely carry five hundred percent overloads for more than ten seconds, and yet can be encased within casings as small as or even smaller than the casings described in the following chart, and can have a six hundred volt A.C. rating:

| Fuse rating in amperes | Casing diameter in inches | Casing length in inches |
| --- | --- | --- |
| 30 | 13/16 | 2 1/4 |
| 60 | 1 1/16 | 2 5/8 |
| 100 | 1 1/8 | 2 5/8 |
| 200 | 1 5/8 | 3 |
| 400 | 2 1/8 | 3 5/8 |
| 600 | 2 5/8 | 3 3/4 |

In addition, because the fuses of the present invention do not use movable connectors or springs, all circuit-opening portions of those fuses can be completely embedded in arc-quenching filler. Moreover, because the fusible elements of those fuses are longer than one-half the lengths of the cavities within the casings of those fuses, and because the low melting point material is adjacent the opposite ends of those fusible elements, the arc-quenching filler in more than one-half the lengths of the cavities within the casings of those fuses is available to extinguish the arcs that form when that low melting point material melts.

The electric fuse of FIGS. 1–8 is particularly well adapted to safely carry substantial overloads for short lengths of time. For example, the heat-absorbing members 80 and 101 and the heat-absorbing members 72 and 94 carry substantially no current, and can act solely as heat-absorbing members. The positioning of the heat-absorbing members 80 and 101 at the ends of the fusible elements 104 and radially outwardly of the heat-generating elements 54 and 84 makes it possible to easily increase the axial lengths of those heat-absorbing members to the desired extent. The spool-like configurations of the heat generating elements 54 and 84 make it possible for those heat-generating elements to have sufficient thermal mass to retard rises in the temperatures thereof and yet to provide the heat required from them. Similarly, the openings 68 in the fingers of the connecting members 62 and 92 make it possible for those connecting members to have sufficient thermal mass to retard rises in the temperatures thereof and yet to provide the heat required from them. As a result, those connecting members are able to help absorb heat when the value of the current flowing through the fuse 20 is below the rating of that fuse, and yet are able to help generate heat when the value of the current flowing through the fuse 20 exceeds the rating of that fuse.

Whereas the drawing and accompanying description have shown and described several preferred forms of the present invention, it should be apparent to those skilled in the art that various changes may be made in the form of the invention without affecting the scope thereof.

What I claim is:

1. An electric fuse that comprises:
    (a) a casing,
    (b) a terminal,
    (c) a second terminal,
    (d) said terminals being secured to the opposite ends of said casing to close said ends of said casing and to define a cavity therein,
    (e) a heat-absorbing member that is disposed between said terminals and that is adjacent the first said terminal,
    (f) a second heat-absorbing member that is disposed between said terminals and that is adjacent said second terminal,
    (g) a heat-generating element that is disposed between and is electrically connected to the first said terminal and the first said heat-absorbing member,
    (h) a second heat-generating element that is disposed between and is electrically connected to said second terminal and said second heat-absorbing member,
    (i) said heat-absorbing members having the confronting faces thereof spaced apart a distance greater than one-half the length of said casing,
    (j) a fusible element that is disposed between and is electrically connected to said heat-absorbing members,
    (k) said fusible element having a length greater than one-half the length of said cavity,
    (l) conductive members that extend between and electrically interconnect said heat-generating elements and said heat-absorbing members,
    (m) readily meltable material at the joints between said fusible element and said heat-absorbing members,
    (n) said fusible element having weak spots therein adjacent said heat-absorbing members and covered by said readily meltable material, and
    (o) arc-quenching filler material that is within said casing and that engages said terminals, heat-absorbing members, heat-generating elements, conductive members, fusible element, and readily meltable material,
    (p) said weak spots in said fusible element coacting with said heat-generating elements to cause most of the heat generated in said fuse to be generated adjacent the opposite ends of said casing,
    (q) the first said heat-absorbing member keeping the readily meltable material at the joint between it and said fusible element from reaching the melting temperature of said readily meltable material until substantially all parts of the first said heat-absorbing member reach that temperature,
    (r) said second heat-absorbing member keeping the readily meltable material at the joint between it and said fusible element from reaching the melting temperature of said readily meltable material until substantially all parts of the said second heat-absorbing member reach that temperature,
    (s) said fusible element responding to overloads in the short circuit range to fuse and prevent further flow of current through said electric fuse,
    (t) said heat-generating elements and said fusible element responding to overloads below the short circuit range to cause the temperatures of said heat-absorbing members to increase until said readily meltable material reaches its melting temperature and causes an arc to form which will cause a portion of said fusible element to fuse and prevent further flow of current through said electric fuse,
    (u) said heat-absorbing members being annular in form and receiving the opposite ends of said fusible element,
    (v) said conductive members extending laterally from said heat-generating elements to said heat-absorbing members,
    (w) said heat-generating elements being cylindrical in form and having reduced-diameter necks.

2. An electric fuse that comprises:
    (a) a casing,
    (b) a terminal,
    (c) a second terminal that coacts with said casing and with the first said terminal to define a cavity,
    (d) a heat-absorbing member that is disposed between said terminals,
    (e) a second heat-absorbing member that is disposed between said terminals,
    (f) a heat-generating element that is disposed between and is electrically connected to the first said terminal and the first said heat-absorbing member,
    (g) a second heat-generating element that is disposed between and is electrically connected to said second terminal and said second heat-absorbing member,
    (h) said heat-absorbing members having the confronting faces thereof spaced apart a distance greater than one-half the length of said cavity,
    (i) a plurality of fusible elements that are disposed between and are electrically connected to said heat-absorbing members,
    (j) each said fusible element having a length greater than one-half the length of said cavity,
    (k) readily meltable material at the joints between said fusible elements and said heat-absorbing members,
    (l) arc-quenching filler material that is within said cavity and that engages said terminals, heat-absorbing members, heat-generating elements, fusible elements, and readily meltable material,
    (m) the first said heat-absorbing member keeping the readily meltable material at the joint between it and said fusible elements from reaching the melting temperature of said readily meltable material until substantially all parts of the first said heat-absorbing member reach that temperature,
(n) said second heat-absorbing member keeping the readily meltable material at the joint between it and said fusible elements from reaching the melting temperature of said readily meltable material until substantially all parts of the said second heat-absorbing member reach that temperature,
(o) said fusible elements responding to overloads in the short circuit range to fuse and prevent further flow of current through said electric fuse,
(p) said heat-generating elements and said fusible elements responding to overloads below the short circuit range to cause the temperatures of said heat-absorbing members to increase until said readily meltable material reaches its melting temperature and causes an arc to form which will cause a portion of said fusible elements to fuse and prevent further flow of current through said electric fuse,
(q) said fusible elements having portions of reduced cross section immediately adjacent said heat-absorbing members,
(r) said readily meltable material engaging and covering said portions of reduced cross section, and
(s) high melting point material electrically connecting said heat-absorbing members to said heat-generating elements,
(t) said heat-absorbing members being substantially infusible and coacting with said high melting point material to substantially isolate said heat-generating elements from said arc,
(u) said fusible elements constituting substantially the only material between said heat-absorbing members which will fuse when said arc forms.

3. An electric fuse that comprises:
(a) a casing,
(b) a terminal,
(c) a second terminal,
(d) a heat-absorbing member that is disposed between said terminals,
(e) a second heat-absorbing member that is disposed between said terminals,
(f) a heat-generating element that is disposed between and is electrically connected to the first said terminal and the first said heat-absorbing member,
(g) a second heat-generating element that is disposed between and is electrically connected to said second terminal and said second heat-absorbing member,
(h) a fusible element that is disposed between and is electrically connected to said heat-absorbing members,
(i) readily meltable material at the joints between said fusible element and said heat-absorbing members,
(j) arc-quenching filler material that is within said housing and that engages said terminals, heat-absorbing members, heat-generating elements, fusible element, and readily meltable material,
(k) the first said heat-absorbing member keeping the readily meltable material at the joint between it and said fusible element from reaching the melting temperature of said readily meltable material until substantially all parts of the first said heat-absorbing member reach that temperature,
(l) said second heat-absorbing member keeping the readily meltable material at the joint between it and said fusible element from reaching the melting temperature of said readily meltable material until substantially all parts of the said second heat-absorbing member reach that temperature.
(m) said fusible element responding to overloads in the short circuit range to fuse and prevent further flow of current through said electric fuse,
(n) said heat-generating elements and said fusible element responding to overloads below the short circuit range to cause the temperatures of said heat-absorbing members to increase until said readily meltable material reaches its melting temperature and causes an arc to form which will cause a portion of said fusible element to fuse and prevent further flow of current through said electric fuse,
(o) said fusible element having the ends thereof abutting said heat-absorbing members and having portions of reduced cross section immediately adjacent said heat-absorbing members, and
(p) said readily meltable material engaging and covering said portions of reduced cross section.

4. An electric fuse that comprises:
(a) a casing,
(b) a terminal,
(c) a second terminal,
(d) a heat-absorbing member that is disposed between said terminals,
(e) a second heat-absorbing member that is disposed between said terminals,
(f) a fusible element that is disposed between and is electrically connected to said heat-absorbing members,
(g) readily meltable material at the joints between said fusible element and said heat-absorbing members,
(h) arc-quenching filler material that is within said housing and that engages said terminals, heat-absorbing members, heat-generating elements, fusible element, and readily meltable material,
(i) the first said heat-absorbing member keeping the readily meltable material at the joint between it and said fusible element from reaching the melting temperature of said readily meltable material until substantially all parts of the first said heat-absorbing member reach that temperature,
(j) said second heat-absorbing member keeping the readily meltable material at the joint between it and said fusible element from reaching the melting temperature of said readily meltable material until substantially all parts of the said second heat-absorbing member reach that temperature,
(k) said fusible element responding to overloads in the short circuit range to fuse and prevent further flow of current through said electric fuse,
(l) said heat-generating elements and said fusible element responding to overloads below the short circuit range to cause the temperatures of said heat-absorbing members to increase until said readily meltable material reaches its melting temperature and causes an arc to form which will cause a portion of said fusible element to fuse and prevent further flow of current through said electric fuse,
(m) said fusible element having at least one of the ends thereof abutting one of said heat-absorbing members and having portions of reduced cross section immediately adjacent said one heat-absorbing member, and
(n) said readily meltable material engaging and covering said portions of reduced cross section.

5. An electric fuse that comprises:
(a) a casing,
(b) a terminal,
(c) a second terminal,
(d) a heat-absorbing member that is disposed between said terminals,
(e) a second heat-absorbing member that is disposed between said terminals,
(f) a heat-generating element that is disposed between and is electrically connected to the first said terminal and the first said heat-absorbing member,
(g) a second heat-generating element that is disposed between and is electrically connected to said second terminal and said second heat-absorbing member,
(h) a fusible element that is disposed between and is electrically connected to said heat-absorbing members,
(i) the first said heat-generating element being wire-like in configuration and being arcuate in part and having a predetermined length to have a predetermined resistance,
(j) said second heat-generating element being wire-like in configuration and being arcuate in part and having a predetermined length to have a predetermined resistance,
(k) readily meltable material engaging said fusible element and said heat-absorbing members at the joints between said fusible element and said heat-absorbing members, and
(l) high melting point material engaging said heat-generating elements and said heat-absorbing members at the joints between said heat-generating elements and said heat-absorbing members to keep arcs from forming between said heat-generating elements and said heat-absorbing members.

6. An electric fuse that comprises:
(a) a casing,
(b) a terminal,
(c) a second terminal,
(d) a heat-absorbing member that is disposed between said terminals,
(e) a second heat-absorbing member that is disposed between said terminals,
(f) a heat-generating element that is disposed between and is electrically connected to the first said terminal and the first said heat-absorbing member,
(g) a second heat-generating element that is disposed between and is electrically connected to said second terminal and said second heat-absorbing member,
(h) a fusible element that is disposed between and is electrically connected to said heat-absorbing members,
(i) the first said heat-generating element being wire-like in configuration and being arcuate in part and having a predetermined length to have a predetermined resistance,
(j) said second heat-generating element being wire-like in configuration and being arcuate in part and having a predetermined length to have a predetermined resistance,
(k) the first said heat-generating element having securing portions on opposite sides of the arcuate part of said heat-generating element that extend generally longitudinally of said casing,
(l) said arcuate part of the first said heat-generating element extending transversely of said casing, whereby the length of said arcuate part will not affect the spacing between the ends of said securing portions of the first said heat-generating element,
(m) said second heat-generating element having securing portions on opposite sides of the arcuate part of said heat-generating element that extend generally longitudinally of said casing,
(n) said arcuate part of said second heat-generating element extending transversely of said casing, whereby the length of said arcuate part will not affect the spacing between the ends of said securing portions of said second heat-generating element, and
(o) meltable material engaging said fusible element and said heat-absorbing members at the joints between said fusible element and said heat-absorbing members.

7. An electric fuse that comprises:
(a) a casing,
(b) a terminal,
(c) a second terminal,
(d) a heat-absorbing member that is disposed between said terminals,
(e) a second heat-absorbing member that is disposed between said terminals,
(f) a heat-generating element that is disposed between and is electrically connected to and directly engages the first said terminal and the first said heat-absorbing member,
(g) a second heat-generating element that is disposed between and is electrically connected to and directly engages said second terminal and said second heat-absorbing member,
(h) a fusible element that is disposed between and is electrically connected to and directly engages said heat-absorbing members,
(i) each of said heat-absorbing members having a heat-generating element engaging one face thereof and a fusible element engaging the opposite face thereof, and
(j) readily meltable material engaging said fusible element and said heat-absorbing members at the joints between said fusible element and said heat-absorbing members.

8. An electric fuse that comprises:
(a) a casing,
(b) a terminal,
(c) a second terminal,
(d) a heat-absorbing member that is disposed between said terminals,
(e) a second heat-absorbing member that is disposed between said terminals,
(f) a heat-generating element that is disposed between and is electrically connected to the first said terminal and the first said heat-absorbing member,
(g) a second heat-generating element that is disposed between and is electrically connected to said second terminal and said second heat-absorbing member,
(h) a fusible element that is disposed between and is electrically connected to said heat-absorbing members,
(i) readily meltable material at the joints between said fusible element and said heat-absorbing members, and
(j) arc-quenching filler material that is within said casing and that engages said terminals, heat-absorbing members, heat-generating elements, fusible element, and readily meltable material,
(k) said fusible element responding to overloads in the short circuit range to fuse and prevent further flow of current through said electric fuse,
(l) said heat-generating elements and said fusible element responding to overloads below the short circuit range to cause the temperatures of said heat absorbing members to increase until said readily meltable material reaches its melting temperature and causes an arc to form which will cause a portion of said fusible element to fuse and prevent further flow of current through said electric fuse,
(m) said readily meltable material at said joints between said fusible element and said heat-absorbing members being spaced apart a distance substantially equal to the length of said fusible element,
(n) whereby a mass of arc-quenching filler material having a length substantially equal to the length of said fusible element is available to extinguish the arcs that will form if said readily meltable material melts.

References Cited by the Examiner
UNITED STATES PATENTS

| | | | |
|---|---|---|---|
| 640,551 | 1/1900 | Downes | 200—120 |
| 1,501,018 | 7/1924 | Lippincott | 200—123 |
| 2,300,620 | 11/1942 | Duerkob | 200—123 |
| 2,667,551 | 1/1954 | Berthel | 200—123 |
| 2,866,875 | 12/1958 | Swain et al. | 200—131 |
| 3,029,328 | 4/1962 | Kozacka | 200—131 |
| 3,116,389 | 12/1963 | Withers | 200—123 |

BERNARD A. GILHEANY, *Primary Examiner.*

HIRAM B. GILSON, *Assistant Examiner.*